July 29, 1941.  C. W. LANPHERE  2,251,213
AUTOMATIC TRANSMISSION
Filed Dec. 6, 1937   5 Sheets-Sheet 1

Inventor
Clive W. Lanphere

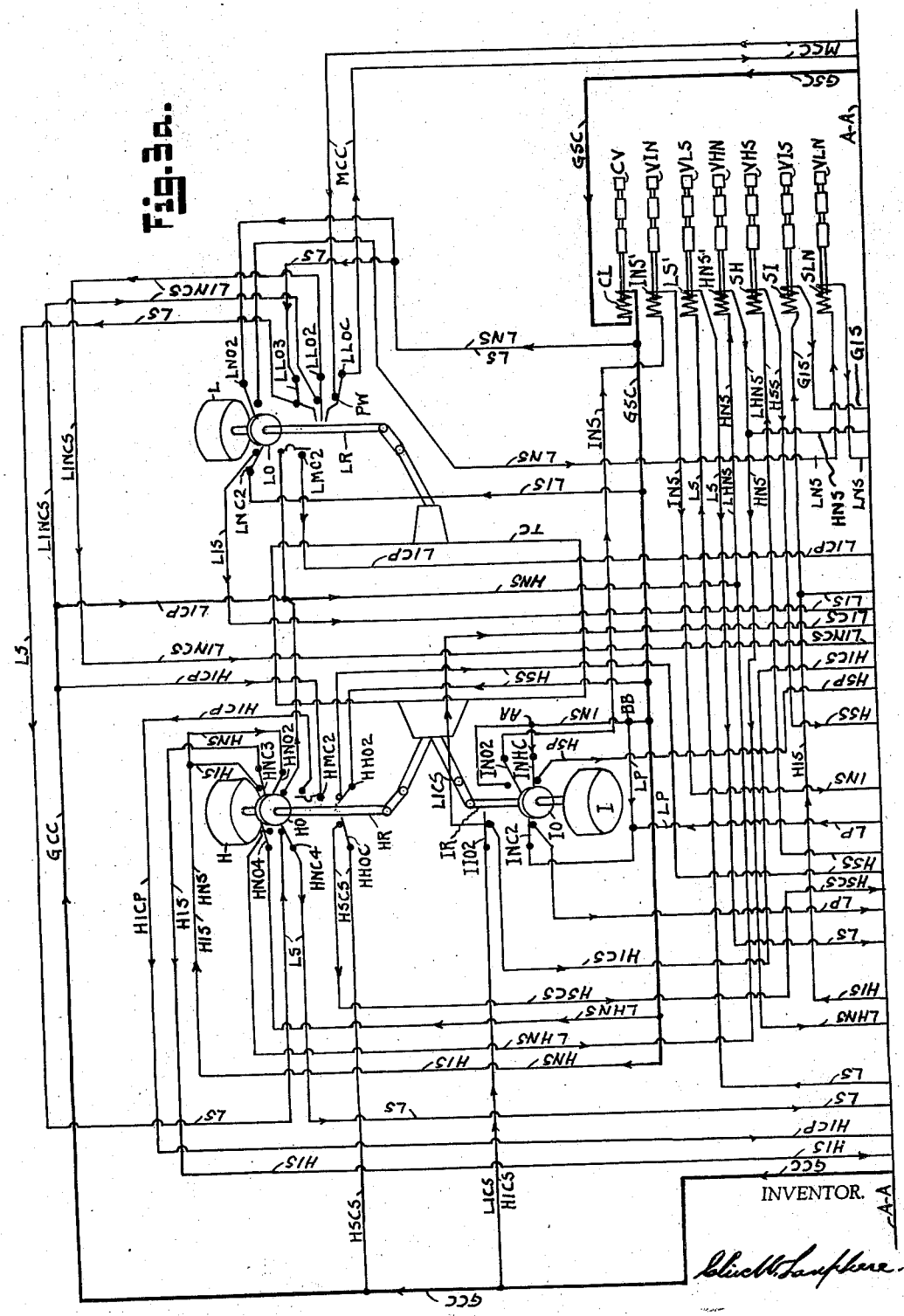

July 29, 1941.　　　C. W. LANPHERE　　　2,251,213
AUTOMATIC TRANSMISSION
Filed Dec. 6, 1937　　　5 Sheets-Sheet 4

INVENTOR

Clive W. Lanphere

Inventor
Clive W Lanphere

Patented July 29, 1941

2,251,213

UNITED STATES PATENT OFFICE 2,251,213

AUTOMATIC TRANSMISSION

Clive W. Lanphere, Ridgewood, N. J.

Application December 6, 1937, Serial No. 178,359

5 Claims. (Cl. 74—336.5)

The present invention relates to an automobile transmission comprising both manual and automatic means for shifting or changing gears.

One object of my invention is to provide means for shifting gears in the usual conventional manner.

Another object of my invention is to provide a speed control also termed centrifugal means for automatically actuating speed changing means.

A further object of my invention is to provide levers that are adapted to automatically become attached to and detached from some of the shifting elements.

A still further object of my invention is to provide electrical actuating means, the circuits of which are adapted to be manually closed and automatically so maintained.

One feature of my invention is to provide automatic means for shifting gears progressively from one speed to another in progressive sequential steps, and for shifting from one speed to another otherwise than in sequential steps.

Another feature of my invention is to provide automatic means for delaying and preventing gear shifting when a car is on a grade.

A further feature of my invention is to provide means for manually preventing automatic gear shifting.

A still further feature of my invention is to provide means for automatically indicating the particular gear that may be functioning at any given time.

The above and other features will be more fully understood by reference to the drawing in which:

Figure 1 is a diagrammatic view of the transmission as seen from above and from the right side of a car with the counter shaft shown in the same plane as the main shaft to better disclose the corelation of the various elements. It also discloses a valve block containing valves for actuating pneumatic cylinders, these cylinders, levers for actuating the shifting elements in the transmission, and a speed control actuating means.

Figure 3a is a diagram showing the continuation of these electrical elements. It also shows their cooperating pneumatic cylinders.

Figure 1:
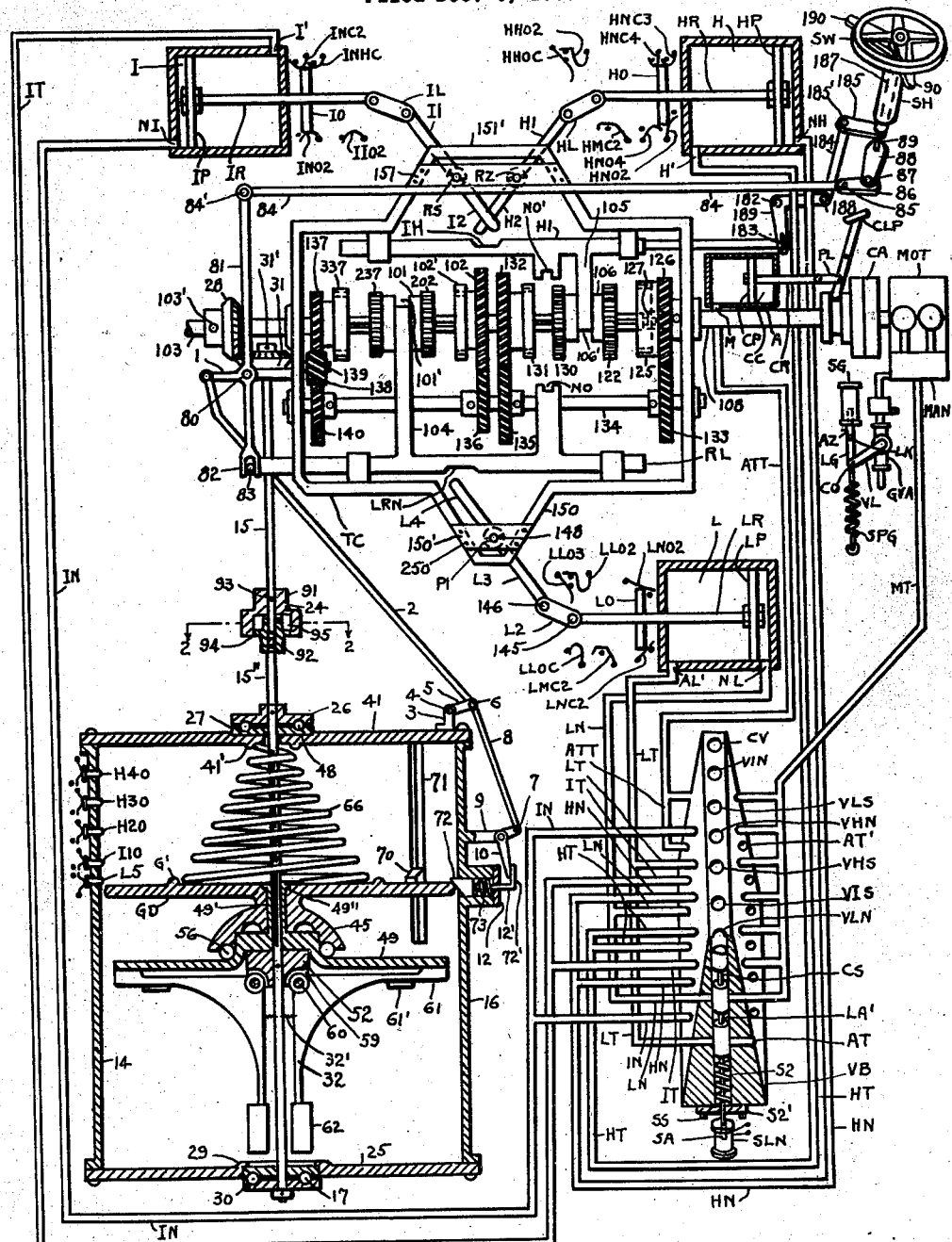
Figure 2:
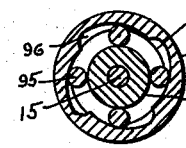
Figure 2 is a diagrammatic cross section of an overrunning clutch used in connection with the speed control means also termed a governor. It is taken on line 2—2 of Figure 1.

In order to show the cooperation of the elements comprising this invention they are shown in plan corelation but it will be obvious that they may be varied as desired in actual construction of the device.

Three forward speeds are disclosed and will be referred to as first or low, second or intermediate, and third or high.

This invention may comprise the well known gasoline motor indicated by reference characters MOT, an automatic clutch of any suitable type in conjunction with a conventional transmission housed within a casing TC, in combination with some modifications and novel elements which will be detailed in the description that follows. One suitable type of automatic clutch is disclosed on pages 28 and 29 of Motor's Handbook for 1934. The automatic clutch shown in Figure 1 of this application is only intended to be diagrammatic.

The transmission may be provided with a main shaft composed of three sections, the clutch connecting two of these sections, and the speed changing elements of the transmission connecting one of the two sections just mentioned with the third section. The third section termed the driven means is designated by reference characters 103 and the center section termed the driving means by characters 108. The characters 127 designate the line of division between the driven section and the driving section. Shaft 103 drives a car in the usual manner. A gear 126 may be rigidly secured to shaft 108. Immovably secured to gear 126 is an internal toothed member 125. A clutch unit 106 can be disposed on and splined to shaft 103. This unit may have an external toothed member 122, and another external toothed member 130. A gear 132 loosely mounted on shaft 103 can be disposed to the rear of unit 106. This gear may be provided with an internal toothed member 131 which is rigidly attached to said gear. Another gear 102 can be loosely mounted on shaft 103 to the rear of gear 132. Immovably secured to gear 102 is an internal toothed member 102'. Another clutch unit 101 may be splined on shaft 103 and like unit 106 is movable thereon. The unit 101 may be provided with external toothed members 202 and 237. To the rear of unit 101 is a gear 137 that can be loosely mounted on shaft 103. This gear is provided with an internal toothed member 337, which is rigidly attached to said gear. Below shaft 103 (shown to the side of this shaft in Figure 1) can be suitably mounted a counter shaft 134. Rigidly attached to this shaft can be a gear 133, which is designed to mesh with gear 126. Another gear 135 may be rigidly secured to shaft 134, said gear being adapted to mesh with gear 132. To the rear of gear 135 another gear 136 can be immovably secured to shaft 134. Gear 136 is designed to mesh with gear 102. Still further to the rear can be disposed a gear 140 which is rigidly secured to shaft 134. A shaft 139 can be suitably mounted in the casing TC and on this shaft can be a gear 138. Gear 140 is designed to mesh with gear 138 and gear 138 is designed to mesh with gear 137. A slidable rail is designated by the characters HI. An arm or yoke 105 connects this rail with unit 106. Another slidable rail is identified by characters RL. This rail has an arm or yoke 104 that connects it with unit 101.

Manual means old in the art for conventional gear shifting may include a shortened lever CH6 that can be adapted to receive a detachable handle (handle not shown). This lever can be pivoted at PLS and when its lower end engages notch NO in rail RL and it is moved forward the yoke 104 which is loosely connected to a groove 101' in clutch unit 101 will actuate this unit towards gear 102 thereby causing the engagement of members 102' and 202 thus tying gear 102 to shaft 103. When it is moved backward members 237 and 337 will mesh thus tying gear 137 to shaft 103. When lever CH6 engages notch NO' in rail HI and it is actuated forwardly the yoke 105 which is loosely connected to a groove 106' in unit 106 will cause members 122 and 125 to mesh tying shafts 103 and 108 together. When it is actuated rearwardly members 130 and 131 will mesh tying gear 132 to shaft 103.

Means adapted to be automatically actuated for shifting rails RL and HI and their respective clutch units 101 and 106 will now be described. The rail RL may be provided with a notch LRN adapted to cooperate with an arm L4 that can be secured by a pin P1 to a shaft 148. A pin 145 may be carried by a piston rod LR and a link L2 can pivot on this pin. This link can also pivot on another pin 146 that may be carried by an arm L3. Arm L3 can be attached to shaft 148 by a pin similar to pin P1 (pin for arm L3 not shown). The piston rod LR can be attached to a piston LP within a pneumatic cylinder L. The shaft 148 can be supported by a wall 149 in an offset 150 of the transmission casing TC and by a plate 150' that may be attached to this offset by any suitable means 250. As similar arms, pins, piston rods, and links may be provided for cooperation with rail HI an outline of how they may be constructed will be given here. Each piston rod can be flattened as indicated at 141 in Figure 5 and can be provided with a hole 142 that may serve as a support for a pin on which its cooperating link may pivot. An offset identified by character F having a shoulder 143 can be secured to each piston rod by means of a bolt or other desirable means 144.

In Figure 1 is shown a block VB that may contain a plurality of cylindrically shaped valves all of which can be of similar design. One of these valves will now be described. It is shown in section and is identified by the letters VLN. A solenoid SLN having a core SA connected to this valve is adapted to actuate this valve in one direction and a spring S2 serves to actuate it in the opposite direction. A plate S2' that can be secured to block VB by screws SS serves to hold spring S2 in contact with said valve. Two circular channels CS and LA' form a part of this valve. The upper channel CS is designed to cooperate with a tube or conduit MT connected with the intake manifold MAN of the motor and with another tube LN connected with an opening NL in the cylinder L. The lower channel LA is designed to cooperate with an opening AT leading to the atmosphere and with a tube LT connected with an opening AL' in cylinder L. Only when solenoid SLN is energized do these channels line up with their respective connections. Under normal condition the spring S2 urges valve VLN to a position that blocks these connections. The operation of this valve and the other valves in block VB will be detailed in their proper places.

Figure 1 shows a governor or speed control electric circuit actuator. This actuator will now be described. It may have a housing 16 of cylindrical design which can be suitably attached to the drive shaft housing or other part of the chassis of a car (drive shaft housing not shown). It may be preferable to set housing 16 in a perpendicular position above the drive shaft at the rear of the transmission. A bevel gear 28 can be secured to the driven shaft 103 by any suitable means such as a pin 103'. Meshing with gear 28 is a gear 31 which may be secured by a pin 31' to a shaft 15. This shaft may be composed of two sections 15 and 15" connected by means of an overrunning clutch or free wheeling unit 24. The exact location of this clutch unit will be determined by the positions of the other elements of this invention. In this disclosure it is shown in a location best suited to show the cooperation of these elements. The shaft 15" can be supported at one point in a wall 25 and at another point in a wall 41. A thrust bearing composed of two segments identified by characters 29 and 30 can be secured to shaft 15" adjacent to wall 25. A circular raceway containing balls 17 may be disposed between segments 29 and 30. Another thrust bearing having segments 26 and 27 and a raceway and balls 48 can be attached to shaft 15" adjacent to wall 41. A collar or disc 52 can be rigidly secured to shaft 15". This collar may carry a series of offsets 59 arranged in pairs that encircle shaft 15". A fin 32 can be pivotally mounted at 60 in each pair of offsets. A spring 32' may be provided to connect each fin with shaft 15". Extending from each fin is an arm 61 and a weight 62. This arm can rest between a pair of offsets 61' carried on a disc 49. This disc may be splined on shaft 15". A third disc GD loosely mounted on this shaft can have an offset or finger 70 adapted to cooperate with a slot 71 in the casing 16. This finger prevents rotation of disc GD. Disc 49 may have a hub 49' adapted to interlock at 49" with disc GD. Disc GD can have an offset 45 which may be provided with a circular raceway and balls 56. A spring 66 may be provided that encircles shaft 15". This spring can rest between offsets 41' and G' on wall 41 and disc GD respectively. Buttons L5, I10, H20, H30, H40 forming parts of switches can be provided. These switches will be described further on. When the driven shaft 103 is rotated gears 28 and 31 rotate shaft 15. This shaft carries a sleeve 91 that can be secured by a bolt 93 or other suitable means to said shaft. Similarly attached to shaft 15" is another sleeve 92. Sleeve 91 overlaps sleeve 92 at 94. Pockets 96 are formed in and by these sleeves and in each pocket can be disposed a roller 95. These pockets are narrower at one side than at the other side. When shaft 103 rotates clockwise the rollers will occupy the narrow side and when this shaft rotates counterclockwise they will be at the wide side. This prevents actuation of shaft 15" when the transmission is functioning in reverse gear. Any suitable type of overrunning clutch may be used if so desired to serve the purpose of the sleeves and rollers comprising unit 24 just described. When shaft 103 rotates clockwise the shaft 15" will rotate thereby causing weights 62 to swing away from this shaft and arms 61 to urge disc 49 in opposition to spring 66. This disc will push disc GD ahead of it which depending on the car speed will actuate the buttons L5, I10, H20, H30, H40 in accordance therewith. Spring 66 actuates disc GD, disc 49, and arms 61 regressively, disc GD in this movement actuating the above mentioned buttons in accordance with the car speed.

Means forming a part of this invention for actuating gear shifts manually will now be described. Shifts between neutral, reverse, and low can be made by actuating a handle 90 that can be located under the steering wheel SW. This handle can be linked to rail RL by the elements now to be described. The handle 90 can be suitably attached to a shaft 89 disposed within a housing SH for a steering wheel shaft (wheel shaft not shown). An arm 88 can be attached to the lower end of shaft 89. Arm 88 may have a ball and socket connection 87 with a link 86. This link can have a ball and socket connection 85 with a rod 84. This rod can be pivotally connected at 84' to a lever 81. Lever 81 may be suitably pivoted at 80 on any suitable support. This support shown is attached to the casing TC. This lever can have a bifurcated end 82 adapted to straddle a post 83 that can be carried by rail RL. An arm 1 integral with or immovably attached to lever 81 can be pivotally connected to a link 2. This link can be pivotally connected to a pivoted support 5. The support 5 can be pivoted at 4 on another support 3 that can be attached to the wall 41. Another link 8 can be pivoted at 6 on the support 5. This link is also pivotally connected at 7 to a bellcrank 10. Bellcrank 10 can be pivotally supported on a support 9. One end of this bellcrank is adapted to contact an offset 72' that can be attached to a rod 12'. This rod is attached to a dog 72 that can be suitably supported in the wall 16 of the governor housing. Dog 72 can have a beveled end as disclosed in Figure 1 for cooperation with disc GD. On the rod 12' between dog 72 and a spring stop 12 is disposed a spring 73. This spring urges dog 72 into the path of disc GD. Shifts of rail HI to its various gear positions and to its neutral position can be made by means which will now be described. A handle 190 placed beneath the steering wheel can be attached to a sleeve 187 positioned within the housing SH. An arm 185 can be secured to sleeve 187 and this arm can have a ball and socket connection 185' to a link 184. Link 184 can be connected at 188 by means of a ball and socket to a lever 189. Lever 189 can be suitably pivoted on a support at 182. This lever can have a slotted end adapted to cooperate with a post 183 that can be carried by rail HI.

Figure 9:
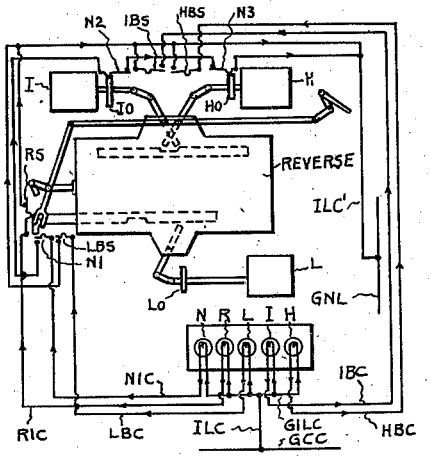
Figure 9 is a plan view of the various positions of the pneumatic cylinders and cooperating levers and rails and optical indicator with the transmission in reverse gear.

The manner of actuating these manual shifts will now be described. The neutral to reverse shift is made by depressing the clutch pedal CLP in the usual way and then moving the handle 90 forwardly to the position shown in Figure 9, which through the linkage to rail RL above detailed moves this rail and with it the clutch unit 101 which ties gear 137 to shaft 103. The clutch pedal can then be released. At this time dog 72 will be held free of disc GD by the bellcrank 10. Reverse to neutral shift is made by depressing the clutch pedal and then actuating rail RL to the position disclosed in Figure 1. This disengages unit 101 from gear 137, which frees this gear from shaft 103. With rail RL in neutral position the dog 72 will be at the position shown in Figure 1. The shift from neutral to low gear is actuated as follows. The pedal is depressed, handle 90 actuated and rail RL moved to the position shown in Figure 10. The unit 101 will be engaging gear 102 which ties this gear to shaft 103. The clutch pedal is then released. Dog 72 will be at the position shown in Figure 1 but arm 10 of the bellcrank lever will be closer to the stop 12. To shift from low gear to neutral the clutch pedal is depressed and handle 90 moved forwardly actuating the rail RL to the position disclosed in Figure 1. Through the linkage already described gear 102 will be freed from shaft 103. Dog 72 will be at the position shown in Figure 1. When disc GD after having actuated automatic shifts (which will be detailed further on) has returned to rest on dog 72 just above the position shown in Figure 1 and the manual shift from low to neutral is made through handle 90 and linkage, dog 72 will be withdrawn from the housing 16 sufficiently to allow disc GD to drop below this dog.

Figure 5:
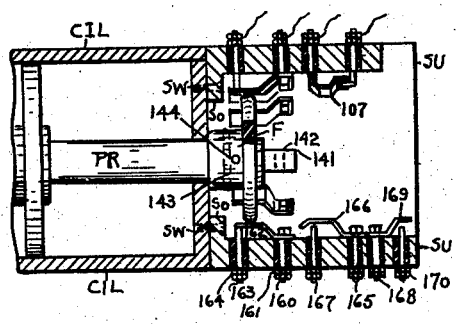
Figure 5 is a longitudinal cross section of a part of a pneumatic cylinder and various switches that may be actuated by it.
Figure 6:
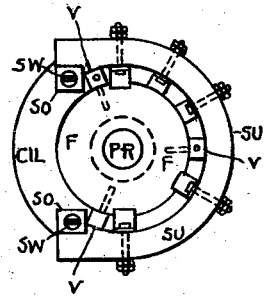
Figure 6 is an end view of an element of a pneumatic cylinder and its cooperating switches.
Figure 4:
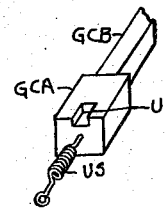
Figure 4 is an isometric view of a gradient circuit breaker.

Before describing the automatic shifts and the electric circuits a brief outline of the construction of the various types of switches that can be used in connection with the pneumatic cylinders will now be given. Figure 5 discloses a cross section of a pneumatic cylinder with these switches and their supporting means. Figure 6 is an end view of Figure 5. As these figures are shown details disclosing the switch constructions. CIL identifies the cylinder, SU a support, and SO an offset on said support. Screws SW can secure this offset to cylinder CIL. A piston rod PR carries the offset F which may be secured to this rod by screws 144. This offset can have fingers V adapted to rest and slide on a concave surface of support SU, these fingers serving to support offset F and the rod PR. On support SU are the switches. Each switch may comprise an insulated post carrying a spring connector and another insulated post with which this connector makes contact. The various piston rods which will be described later are adapted to actuate switches which may be located adjacent to the neutral position, the gear engaging position, and midway position of these piston rods. One of these switches disposed at the neutral position of rod PR has a post 160, a lead 161, a spring connector 162, and a contact post 163. A lead 164 is attached to post 163. Another switch disposed midway between the neutral and gear engaging positions of offset F on rod PR may be provided with a post 165 carrying a spring connector 166, which can be adapted to contact a post 167. A lead may be connected to each of posts 165 and 167. A third switch is shown positioned at the gear engaging position of rod PR. This switch may have a post 168, a spring connector 169, and a contact post 170. As shown in Figure 5 offset F at neutral position is holding connector 162 in contact with post 163. The connector 166 of the midway switch is shown in its open position. When offset F brushes across connector 166 this connector is momentarily held in contact with post 167. When offset F is at its gear engaging position it holds connector 169 in contact with post 170. Offset F can be made of insulated material. Characters 107 identify a switch adapted to be opened by it. The character 107 identifies a type of switch adapted to be opened by offset F.

Electrical circuits

The electric circuits forming a part of this invention may be classified in three general groups. The group now to be described are termed general circuits as some of them always function and others sometime function during each gear shift whereas other circuits to be detailed further on only function during a specific gear shift.

Figure 3:
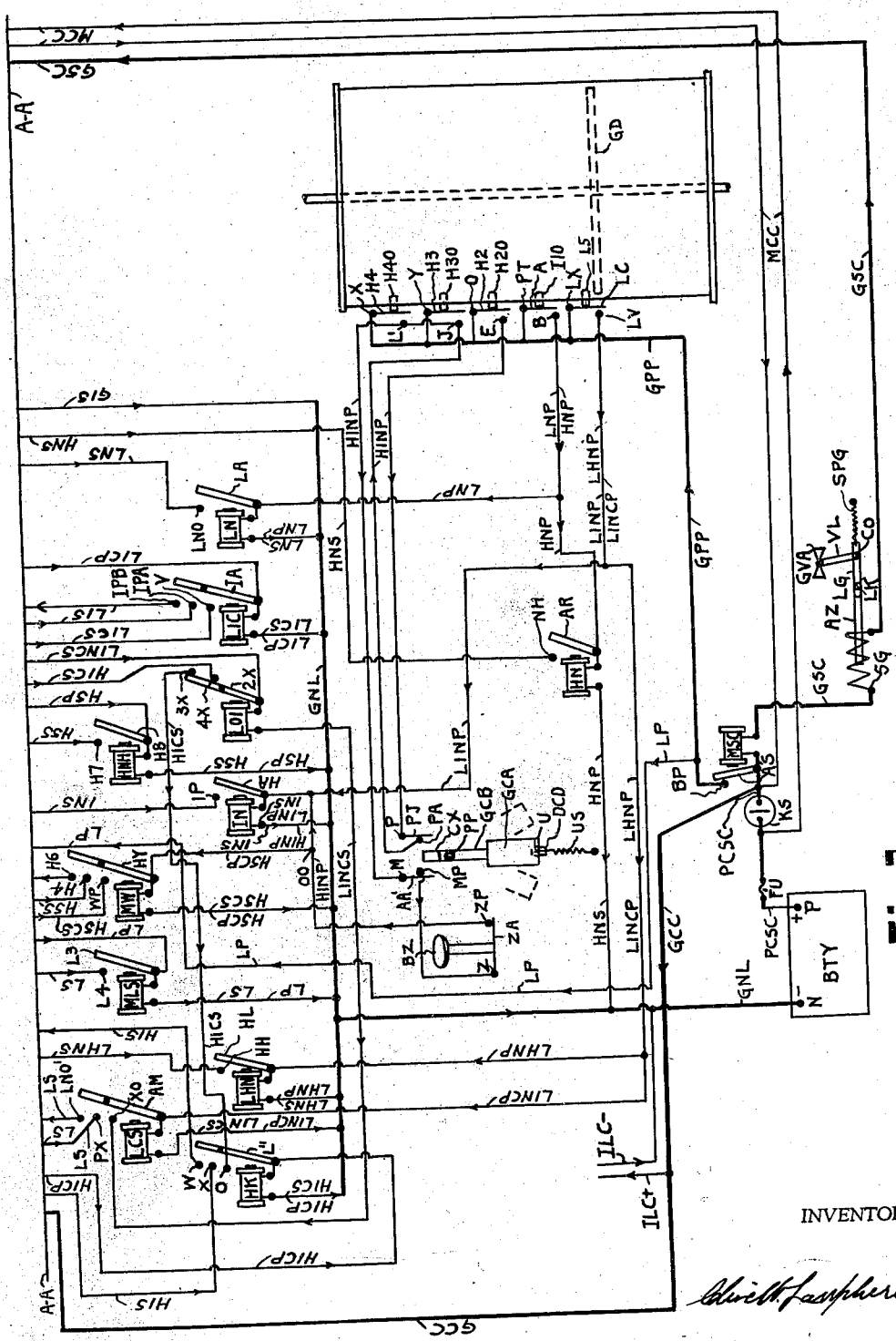
Figure 3 is a diagram disclosing some of the electrical elements some of which are shown broken away on line A—A.

Referring to Figure 3 a lead PCSC is shown connected to the positive pole P of the battery BTY. It extends from this pole to a fuse FU, to a key operated switch KS and to a magnet MSC. This switch can be placed near to the driver on any suitable support. A lead MCC branches from lead PCSC between the battery and switch KS, and continues to a switch LLOC adjacent to the low gear position of a piston rod LR of a pneumatic cylinder L. From switch LLOC the lead MCC continues to lead PCSC at a point between switch KS and magnet MSC. Lead MCC and switch LLOC make it impossible to turn off the current during automatic shifts which were it done would break up the functional sequence of the shift actuating circuits which would cause interference of some of the elements in the event the current were again turned on. This lead is connected to a post PW at switch LLOC. The spring connector of this switch is normally in contact with post PW. Rod LR is provided with an offset LO which when at low gear position holds the connector of this switch out of contact with post PW. The closure of switch LLOC when rod LR leaves low gear position which occurs as soon automatic shifting starts assures a positive connection between pole P of the battery, lead GCC and magnet MSC even with switch KS turned off. When rod LR returns to low gear position it opens switch LLOC at post PW, making it possible to functionally disconnect the circuits at switch KS. When a governor actuated switch is closed current flows through magnet MSC and by means of lead GSC back to the negative pole N of the battery. Magnet MSC has an armature AS resiliently actuated to normally contact a post BP. Its purpose will be explained shortly. A general primary positive lead GPP extends from member BP. This lead serves as a feeder to several gear shift circuits. Extending from magnet MSC is a lead GSC forming a general secondary circuit. In this circuit is a solenoid SG adapted to actuate a rotary gas valve GVA. See Figures 1 and 3. This valve may be provided with a lever VL. A link LG can be pivotally connected at CO to this lever and at LK to a core AZ of solenoid SG. A spring SPG holds valve GVA in open position. When solenoid SG is energized the flow of gas to the motor is reduced. In circuit GSC is another solenoid CL adapted to actuate a valve CV. This valve can be similar to the accelerator valve shown in the automatic clutch mechanism disclosed in the Motor's Handbook previously referred to. Valve CV shown in the present disclosure through means now to be described actuates the disengagement of a clutch CA. Valve CV is disposed in valve block VB. This valve has two channels encircling it. On the right side as viewed in block VB are two openings, one connected to a tube MT and one open to the atmosphere. These openings are to be nearer each other than are the two openings of similar nature already described in valve VLN. When valve CV is drawn to its projected position one channel connects tube MT with a tube ATT. Tube ATT is connected with an aperture M in a pneumatic cylinder CC. Simultaneously with the connection of tubes MT and ATT by this channel another channel in valve CV is not in line with the aperture AT' and tube ATT. This position of valve CV allows the manifold MAN to draw air from aperture M and prevents air entering said aperture from aperture AT'. Piston CP and rod CR move towards aperture M which by means of link PL and pedal CLP disengage the clutch CA. When solenoid CL is not energized valve CV urged by its spring returns to normal position with the first mentioned channel out of line with tubes MT and ATT and the second mentioned channel in line with aperture AT' and tube ATT. This allows air to enter aperture M and the clutch to pull rod CR towards aperture A in cylinder CC as the clutch becomes engaged. Aperture A is always open affording the passage of air to and from cylinder CC as is required in the movement of piston CP. The circuit GSC is energized whenever the disc GD actuates a switch thus assuring disengagement of the conventional clutch CA, the actuation of valve GVA, and the opening of circuit GPP at armature AS and post BP, the latter function preventing actuation of a plurality of gear shift circuits by disc GD at the same time. A general lead GCC that branches from lead PCSC is not effected by armature AS. This lead has several branch leads adapted to cooperate with some of the gear shift circuits. These will be described in their proper places.

GEAR SHIFT CIRCUITS

A second group of general circuits will now be described. These comprise several individual circuits each of which is adapted to function simultaneously with some or all of the general circuits. To assure proper functioning of these circuits piston rod LR of cylinder L is set in low gear position and the rail RL in neutral position when assembling the car. Details covering this will be given in the description of the actuation of switch L5 when disc GD moves regressively in the shift of intermediate to low gear and also in the description of the regressive movement of this disc in the shift directly from high to low gear. After the manual shift from neutral to low gear has been made the gas accelerator (accelerator not shown) is depressed in the usual manner. As the car speed increases disc GD moves in opposition to spring 66 and passes button switch L5 without actuating any electric circuit and upon reaching switch I10 actuates it. This energizes the first of a series of circuits that are adapted to actuate gear shifting elements of the device. These circuits, their cooperating elements, and the operation of these circuits and cooperating elements will now be described in sequence.

Low to Intermediate Gear Shift Circuits

Part 1—Low to neutral circuits

The switch I10 when actuated by disc GD energizes a primary circuit LNP. This circuit branches from the primary positive lead GPP continues to a post PT, to a spring connector A of switch I10, to a post or contact member B, to a magnet LN, to lead GNL and to the negative pole N of the battery BTY. When this circuit is energized an armature LA of magnet LN contacts this magnet which closes a secondary circuit LNS which remains closed whether switch I10 is closed momentarily or longer. Circuit LNS branches from the general secondary lead GSC, continues to a switch LNO2 adjacent to the neutral position of offset LO on rod LR of cylinder L. This switch is in closed position at the time switch I10 is actuated. From switch LNO2 circuit LNS continues to the solenoid SLN, to a contact member LNO, to armature LA, to magnet LN, to lead GNL, and to the negative pole N of the battery. Switch I10 at this time does not complete a circuit HNS because of other switches therein being open.

Operation of the low to neutral shift

Figure 10:
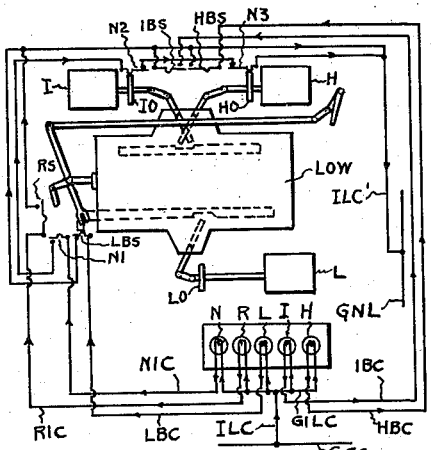
Figure 10 is a plan view of the same elements disclosed in Figure 9 but with the transmission in low gear.

At the start of this shift piston rod LR is at the position shown in Figure 10. When circuit LNS is energized the clutch CA and gas valve GVA are actuated as described under the heading "Electrical circuits" and the solenoid SLN draws valve VLN to its projected position. In this position its encircling channels CS connects tube MT with tube LN and its channel LA' connects an aperture AT leading to the atmosphere with a tube LT. By means of these connections the manifold MAN draws air from aperture NL while air enters aperture AL' in cylinder L. Piston rod LR is drawn towards aperture NL. This rod by means of link L2 swings arm L3 which rotates shaft 148 which swings arm L4. This arm enters notch LRN in rail RL carries this rail with it and leaves said notch coming to rest clear of rail RL. This rail will then be at neutral position and will have actuated yoke or arm 104 and with it clutch unit 101 to neutral position and members 102' and 202 will be disengaged freeing low gear 102 from shaft 103, the positions shown in Figure 1. When rod LR reaches its neutral position its offset LO opens switch LNO2 and therewith the circuit LNS. This releases solenoid SLN and with it valve VLN. This valve urged by its spring S2 returns to normal position thus blocking the tube connections between the atmosphere, the manifold, and cylinder L.

Low to Intermediate Gear Shift Circuits

Part 2—Intermediate neutral to intermediate circuits

A circuit LIS and its continuation GIS that cooperates with elements for actuating the shift of piston rod IR from neutral to intermediate gear engaging position will now be described. It branches from lead GSC, continues to a switch LNC2 normally open adjacent to the neutral position of rod LR, to a post or contact member IPA adjacent to a magnet LIC, to an armature IA normally open, to a post or contact member IPB, to lead GIS, to solenoid SI, to lead GNL, and to the negative pole of the battery. In the shift of low to neutral just described when rod LR reaches its neutral position its offset LO closes switch LNC2 just before switch LNO2 is opened. The reason for having circuit LIS pass through posts IPA and IPB and armature IA is to provide a second point of closure in the circuit LIS GIS in addition to its closure by switch LNC2. This prevents actuation of circuit LIS GIS during the shift of intermediate to high gear which could otherwise occur because switch LNC2 would be closed at that time.

If rod IR of cylinder I opened this circuit directly this circuit would close at the gear position of said rod when it moves to neutral position during the shift of intermediate to high gear which with its closure at switch LNC2 would actuate the shift of rod IR from its neutral to its gear position. The shift of intermediate to high gear will be described at its proper place. The means for closing circuit LIS GIS at the aforesaid second point will now be described. A switch LMC2 normally open is disposed at a position about midway between the neutral and gear engaging positions of rod LR. When this rod moves from one of these positions to the other its offset LO brushes across this switch and momentarily closes it, thereby closing a primary circuit LICP. This circuit begins at lead GCC, continues to switch LMC2, to magnet LIC, to lead GNL, and to the negative pole of the battery. Energizing of circuit LICP draws armature IA into contact with magnet LIC thereby closing a secondary circuit LICS. Starting at lead GCC it continues to a switch II02, normally closed adjacent to the gear engaging position of piston rod IR, continues to a post or contact member V, to armature IA, to magnet LIC, to lead GNL, and to the negative pole of the battery. When circuit LICS functions, the upper end of armature IA which is insulated from its lower end as indicated by a heavy cross line connects posts IPA and IPB. When rod IR reaches intermediate gear engaging position its offset I0 opens switch II02 and therewith circuit LICS, releasing armature IA which opens circuit LIS GIS at posts IPA and IPB.

Operation of the intermediate neutral to intermediate gear shift

Figure 11:
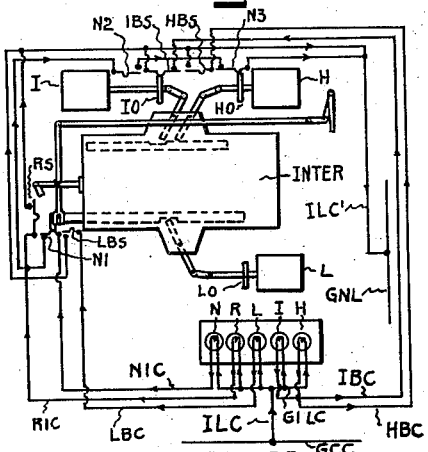
Figure 11 is a plan view of the same elements shown in Figure 9 but with the transmission in intermediate gear.
Figure 12:
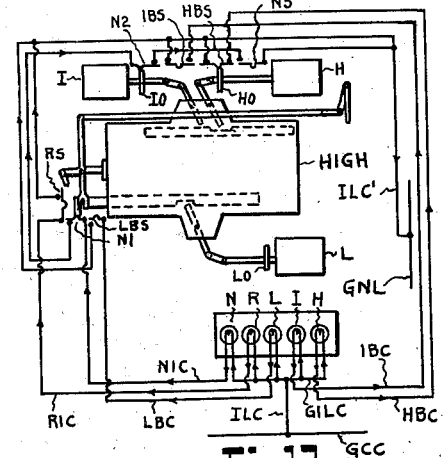
Figure 12 is a plan view of the same elements disclosed in Figure 9 but with the transmission in high gear.
Figure 8:
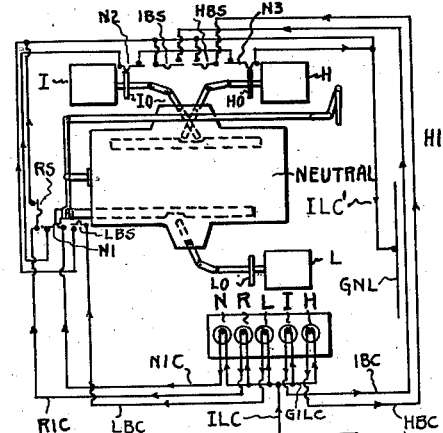
Figure 8 is a plan view of an optical indicator and cooperating elements as disposed with the transmission in neutral position.
Figure 7:
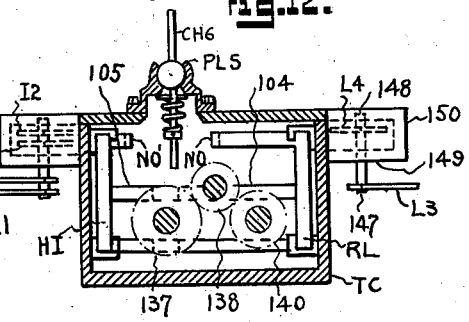
Figure 7 is a diagrammatic cross section of the transmission as seen from the rear showing some of the elements.

At the start of this shift rod IR is at the position shown in Figure 1. The movement of rod LR already described in the shift of low to neutral first closes switch LMC2 and therewith circuit LICS thus closing circuit LIS GIS at posts IPA and IPB. Upon reaching its neutral position the rod LR by means of its offset LO closes switch LNC2 and therewith circuit LIS GIS thus completing the closure of this circuit at two points. Energizing of circuit LIS GIS actuates the clutch CA and gas valve GVA as described under the heading "Electrical circuits" and actuates solenoid SI which draws a valve VIS to its projected position. This valve movement lines up a channel in it with a tube IT that is connected with an aperature I' in a cylinder I and with the tube MT connected with the manifold. This movement simultaneously lines up another channel with an aperture leading to the atmosphere and with a tube IN connected with aperture NI in cylinder I. The manifold then draws air from aperture I' causing a piston IP and its rod IR to move towards aperture I'. This rod by means of a link IL, an arm II, a shaft RS, and an arm I2 moves rail HI from its neutral to its intermediate gear position, the position disclosed in Figure 11. Rail HI by means of arm or yoke 105 carries clutch unit 106 with it thereby tying intermediate gear 132 to shaft 103. As already described in the description of the circuits for this shift rod IR opens switch IIO2 and therewith the circuits. Valve VIS urged by its spring returns to normal position thereby blocking the connections between cylinder I, the manifold and the atmosphere.

INTERMEDIATE to HIGH GEAR SHIFT CIRCUITS

Part 1—Intermediate to intermediate neutral shift circuits

When the car attains a speed that has been predetermined as best for actuating the shift from intermediate to high gear, let us assume this to be twenty miles per hour, by properly proportioning the governor elements the switch H20 will be actuated at that speed. Its spring connector H2 will contact a post or contact member E thereby closing a circuit HINP. This circuit branches from lead GPP, continues to a post O, to a post Y of button switch H30 and to a post X of a button switch H40. The reason for these connections to switches H30 and H40 will be described further on. From post E circuit HINP continues to a spring connector PJ of a switch P normally closed, to a post J of switch H30, to a post L' of switch H40, to a spring connector AA' of a switch M normally closed, to a post MP, to a foot actuated switch Z and its connector ZA, to a post ZP, to a magnet IN, to lead GNL and to the negative pole of the battery. A button BZ can be placed in a position to actuate connector ZA, thus button being adapted to be actuated by the driver's left foot. Actuation of circuit HINP draws an armature HA into contact with magnet IN thereby closing a secondary circuit INS. This circuit branches from the general secondary circuit GSC, continues to a switch INO2 normally closed adjacent to the neutral position of piston rod IR., to a solenoid INS', to a post IP, to armature HA, to magnet IN, to lead GNL, and to the negative pole of the battery. The connections between switches H20, H30, and H40 make it possible to actuate circuits HINP and INS' at various car speeds. These switches are adapted to close another primary circuit HSCP and its cooperating secondary circuit HSCS. These circuits will be described in the description of the high neutral to high gear shift.

Operation of the intermediate to intermediate neutral shift

Circuit INS when closed by one of the switches H20, H30, and H40 through their respective connectors H2, H3, and H4 actuates clutch CA and gas valve GVA as described under the heading "Electrical circuits" and also actuates solenoid INS'. This solenoid pulls a valve VIN to its projected position, lining up one channel with tube MT and tube IN thus connecting the manifold with aperture NI of cylinder I and lining up another channel with the opening to the atmosphere and with tube IT. This permits the manifold to draw air from aperture NI causing rod IR to move towards this aperture. At the start of this shift rod IR is at the position shown in Figure 11. As this rod moves toward aperture NI its connection with arm I2 already described causes this arm to enter and leave notch IH in rail HI thus moving this rail to its neutral gear position said rail by means of yoke 105 carrying unit 106 with it freeing gear 132 from shaft 103. Offset IO of rod IR opens switch INO2 thereby opening circuit INS, releasing solenoid INS' and with it valve VIN. This valve returns to normal position blocking the connections between the manifold, the atmosphere, and cylinder I.

INTERMEDIATE TO HIGH GEAR SHIFT CIRCUITS

Part 2—High neutral to high shift circuits

When rod IR reaches its neutral position in the shift just described its offset IO closes a switch INHC thereby closing a primary circuit HSP. This switch is closed just before switch INO2 is opened. Circuit HSP branches from circuit INS at AA, continues to switch INHC, to magnet HNH, to lead GNL, and to the negative pole of the battery. Closure of this circuit energizes magnet HNH drawing an armature H8 into contact with it thereby closing a secondary circuit HSS. This circuit branches from lead GSC, continues to a switch HHO2, to a post H4 adjacent to a magnet MW, to the upper insulated end of an armature HY, to a post H6, to a solenoid SH, to post H7, to armature H8, to magnet HNH, to lead GNL, and to the negative pole of the battery. Circuit HSS in addition to its closure by switch INHC is closed by armature HY of a magnet MW. The closure by armature HY will now be described. When any one of the switches H20, H30, H40 is actuated which energizes circuit HINP another primary circuit HSCP is closed and therewith its cooperating circuit HSCS. Circuit HSCP branches from lead HINP at OO, continues to magnet MW, to lead GNL, and to the negative pole of the battery. The energizing of this circuit actuates magnet MW which attracts armature HY thereby energizing circuit HSCS. The latter circuit branches from lead GCC, continues to a switch HHOC, to a post WP, to armature HY, to magnet MW, to lead GNL, and to the negative pole of the battery. The upper end of armature HY is insulated from its lower end as indicated by a heavy cross line. The upper end connects a pair of posts H4 and H6, thereby closing circuit HSS at this point. The reasons for this second closure will now be given. When rod IR shifts from intermediate gear position to its neutral position which it does in both the shifts of intermediate to high and intermediate to low its offset IO closes switch INHC and therewith circuit HSS. This circuit actuates the shift of rod HR from neutral to its high gear position. By having all of the switches H20, H30, H40 actuate circuit HSCS which is necessary to produce a complete closure of circuit HSS the rod IR can not actuate the rod HR to its gear position during the shift of low to intermediate.

Operation of the high neutral to high shift

When one of the switches H20, H30, H40 and switch INHC are actuated, circuit HSS functions and solenoid SH draws valve VHS to its projected position. This lines up one of its channels with tube MT and with tube HT and another of its channels with the opening leading to the atmosphere and with tube HN. The manifold then draws air from aperture H' in cylinder H while air enters this cylinder at aperture NH. Piston rod HR moves towards aperture H' and by means of link HL, arm HI, shaft RZ, and arm H2, the latter arm entering and leaving notch IH in rail HI, actuates rail HI from its neutral to its high gear engaging position. This rail by means of yoke 105 carries unit 106 with it thereby causing members 122 and 125 to mesh thereby tying shafts 103 and 108 together, with rod HR at gear position. When rod HR reaches its gear engaging position its offset HO opens switch HHO2 and therewith circuit HSS. This releases solenoid SH allowing valve VHS to return to normal position blocking the tube connections between the manifold, the atmosphere and cylinder H. Offset HO also opens switch HHOC.

*Means for preventing high gear shifts on grades*

Means adapted to automatically delay or prevent the shift of intermediate to high gear will now be described. It may comprise a gradient control GCB pivotally supported at PP and two cooperating switches P and M. The control has an upper arm CX that is insulated from a lower arm GCA. The relative proportions of these arms can be varied as best suited, and they can be supported by a close fitting casing (casing not shown). A spring US can be attached at one end to a suitable support (support not shown) and at its other end to the arm GCA for the purpose of steadying the circuit control against vibration. A dog DCB suitably supported (support not shown) may be adapted to engage a notch U in the arm GCA. A lever that may be provided with a link connection to this dog for manual operation can be placed near the driver (lever and link not shown). When the car is ascending a grade the arm GCA seeks to maintain a perpendicular position by pivoting at PP. The switch P can be so placed that when the car ascends a grade of predetermined degree the upper end CX of member GCB will open this switch by impinging on and moving its connector PJ away from contact member PA thus opening that portion of circuit HINP that is closed by switch H20 thus preventing this switch actuating circuit HINP. By suitably designing the governor to actuate button switch H30 at a car speed of thirty miles per hour circuit HINP is closed when a connector H3 contacts a post J at that speed thus actuating the shift of intermediate to high. When the car is descending a grade of predetermined degree arm CX will swing against a connector AA' of switch M thus opening all the leads from the switches H20, H30, H40 therewith opening circuit HINP.

*Manual control of intermediate to high gear shift*

The floor button BZ when depressed by the driver's foot will move connector ZA away from contact post ZP therewith opening circuit HINP and thereby preventing the intermediate to high shift. This switch can be used in conjunction with the gradient circuit control or without this control. When used without it the dog DCB is actuated to engage notch U in arm GCA. The button switch H40 is designed to assure a shift of intermediate to high in the event the driver holds the button BZ depressed until the car attains a speed of forty miles per hour. This switch actuates circuit HINP by moving its connector into contact with post L' in that circuit.

HIGH TO INTERMEDIATE GEAR SHIFT CIRCUITS

*Part 1—High to neutral circuits*

As stated in the description of the low to intermediate shift the governor disc GD actuates switch I10 at a car speed of ten miles per hour. When this switch is actuated with high gear functioning it does not actuate circuit LNS because rod LR is at its neutral position and holding switch LNO2 open in that circuit, but it does close a primary circuit HNP. This circuit branches from lead GPP, continues to post PT, to spring connector A, to post B, to a magnet HN, to lead GNL, and to the negative pole of the battery. This draws armature AR into contact with magnet HN which closes a secondary circuit HNS. Circuit HNS branches from lead GSC, continues to a switch HNO2, to a solenoid HNS', to a post NH, to armature AR, to magnet HN, to lead GNL, and to the negative pole of the battery.

*Operation of high to neutral shift*

When circuit HNS is energized the clutch CA and gas valve GVA are actuated as described under the heading "Electrical circuits" and the solenoid HNS' draws a valve VHN to its projected position. This lines up one valve channel with tube MT and with tube HN and the other valve channel with tube HT and with the opening to the atmosphere. This allows the manifold to draw air from aperture NH while air enters aperture H' in cylinder H. Piston HP and rod HR move towards aperture NH which actuates arm H2 oppositely to its movement in the intermediate to high shift. This actuates rail HI and unit 106 to their neutral positions disconnecting shafts 103 and 108. When rod HR reaches neutral position it opens switch HNO2 and therewith circuit HNS thus releasing solenoid HNS' allowing valve VHN to return to normal position blocking the tube connections between the manifold, the atmosphere, and cylinder H.

HIGH TO INTERMEDIATE GEAR SHIFT CIRCUITS

*Part 2—Intermediate neutral to intermediate circuits*

When the piston rod HR reaches neutral position its offset HO closes switch HNC3 and therewith circuit HIS and its continuation GIS. This circuit branches from circuit GSC, continues to switch HNC3, to a post X adjacent to a magnet HK, to the upper end of an armature L", to a post W, to solenoid SI, to lead GNL, and to the negative pole of the battery. In the movement of rod HR from its gear engaging position to its neutral position it brushes by and momentarily closes a switch HMC2 that can be positioned about midway between the neutral and gear positions of offset HO on rod HR. This switch closes a primary circuit HICP which branches from lead GCC, continues to switch HMC2, to magnet HK, to lead GNL, and to the negative pole of the battery. This closes a secondary circuit HICS by drawing armature L" into contact with magnet HK. Circuit HICS branches from lead GCC, continues to a switch IIO2 normally closed, adjacent to the gear engaging position of offset IO on rod IR, to a post 4x, to an armature 2X, to a post 3X near a magnet LOI, to a post O at magnet HK, to armature L", to magnet HK, to lead GNL, and to the negative pole of the battery. The heavy line on armature L" indicates an insulation between its upper and lower ends. The upper end connects post X with post W. These posts with armature L" close circuit HIS GIS at an additional point. With circuit HIS GIS closed the solenoid SI draws valve VIS to its projected position lining up its two channels with the tubes as detailed in the description of the shift of low to intermediate.

Operation of the intermediate neutral to intermediate shift

The switch HNC3 that actuates circuit HIS GIS is closed just before switch HNO2 is opened. With this circuit energized the clutch CA and gas valve GVA are actuated as described under the heading "Electrical circuits" and the piston rod IR, arms I1—I2, rail HI, and clutch unit 106 move similarly to their movements in the shift of low to intermediate and come to rest at the positions indicated in Figure 11. Rod IR at gear position by means of its offset IO opens switch II02 which opens circuit HICS thereby opening circuit HIS GIS at armature L" as this armature is released when circuit HICS ceases to function. The opening of circuit HIS GIS releases solenoid SI whereupon valve VIS returns to normal position blocking the tube connections between the manifold, the atmosphere, and cylinder I. If piston rod IR were the only means for opening the HIS GIS circuit when said rod is at gear position this circuit would be closed and energized when this rod leaves its gear position in the shift of intermediate to low (a shift to be shortly described) because rod HR at this time would be at its neutral position holding switch HNC3 closed and therewith circuit HIS GIS which would actuate the shift of rod IR from neutral to its gear position. Switch HMC2 and its cooperating circuit HICS prevent this. When rod HR in the shift of intermediate to high gear passes and actuates switch HMC2 it does not completely close circuit HIS GIS because switch HNC3 is open and magnet HK dead with its armature L" out of contact with posts X and W in the HIS GIS circuit.

INTERMEDIATE TO LOW GEAR SHIFT CIRCUITS

Part 1.—Intermediate to intermediate neutral circuits

With the car functioning in intermediate gear at a speed of approximately five miles per hour the governor disc GD will come to rest on dog 72. This disc will then actuate switch L5 and thereby close a primary circuit LINP. This circuit branches from lead GPP, continues to a post LX, to a spring connector LC, to a post LV, to magnet IN, to lead GNL, and to the negative pole of the battery. This draws armature HA into contact with magnet IN thereby closing the secondary circuit INS. This is the same circuit that has already been described in the shift of intermediate to high gear. It extends from circuit GSC to switch IN02, to solenoid INS', to post IP, to armature HA, to magnet IN, to lead GNL, and to the negative pole of the battery.

Operation of intermediate to intermediate neutral shift

The operation of this shift is the same as already detailed in the shift of intermediate to high so will not be described here. Suffice it to state that the clutch CA and gas valve GVA are actuated as detailed under the heading "Electrical circuits" and the clutch unit 106 is actuated from intermediate gear position to neutral position freeing intermediate gear 132 from shaft 103.

INTERMEDIATE TO LOW GEAR SHIFT CIRCUITS

Part 2.—Low neutral to low circuits

When piston rod IR in its shift from gear position to neutral position reaches said neutral position its offset IO closes switch INC2 just before it opens switch IN02. Closure of switch INC2 closes a primary circuit LP. This circuit branches from circuit INS at the point marked BB and also from lead GPP, continues to switch INC2, to a magnet MLS, to lead GNL, and to the negative pole of the battery. The lead LP connected to circuit INS can not function in a shift of high directly to low (to be described further on) so is also connected to lead GPP. Closure of circuit LP draws armature L3 into contact with magnet MLS which closes a secondary circuit LS. Circuit LS branches from circuit KSC, continues to a switch LL03 normally closed adjacent to the low gear position of offset LO on rod LR of cylinder L, to a switch HNC4 adjacent to the neutral position of offset HO on rod HR, to a post PX, to the upper end of an armature AM of a magnet LCS, to a post LNO, to a solenoid LS', to post L4 of magnet MLS, to armature L3, to magnet MLS, to lead GNL, and to the negative pole of the battery. Armature AM is insulated as indicated by the heavy cross line. Switch HNC4 is held closed by offset HO when rod HR is at its neutral position. Its purpose will be explained at the proper place. When switch L5 is actuated as described in part 1 of the "Intermediate to low shift" in addition to closing circuites LINP and INS it also closes a primary circuit LINCP. This circuit branches from lead GPP, continues to post LX, to spring connector LC, to post LV, to magnet LCS, to lead GNL, and to the negative pole of the battery. This draws armature AM into contact with magnet LCS which closes a secondary circuit LINCS. This circuit branches from lead GCC, continues to a switch LL02 adjacent to the low gear engaging position of offset LO on rod LR, to a magnet LOI, to a post XO adjacent to armature AM of magnet LCS, to armature AM, to magnet LCS, to lead GNL, and to the negative pole of the battery. The upper end of armature AM serves to close circuit LS at posts PX and LNO'. Circuit LINCS remains closed until rod LR reaches low gear position whereupon its offset LO opens switch LLO2 and therewith circuit LINCS which opens circuit LS at posts PX and LNO. In the shift of intermediate to high gear previously described piston rod IR closes switch INC2 but as circuit LS which this switch closes has to be closed at another point through the actuation of switch L5 closure of switch INC2 during the shift of intermediate to high does not effect circuit LS.

Operation of the low neutral to low shift

When circuit LS is energized the clutch CA and gas valve GVA are actuated as described under the heading "Electrical circuits" and the solenoid LS' actuates a valve VLS to its projected position lining up one channel with tube MT and with tube LT that is connected with aperture AL' in cylinder L and another channel with tube LN and with the opening in block VB to the atmosphere. This actuates piston LP and with it rod LR from their neutral positions to their gear engaging positions, the positions indicates in Figure 10. By means of link L2, rod LR swings arm L3 which rotates shaft 148 which in turn swings arm L4 which enters and leaves notch LRN in rail RL thereby moving this rail to its low gear engaging position. Rail RL carries clutch unit 101 with it which produces an engagement of members 102' and 202 thereby tying low gear 102 to shaft 103. When rod LR reaches low gear position it opens switch LLO3 and therewith circuit LS. This rod also opens switch LLO2 and with it circuit LINCS, which at armature AM also opens circuit LS. Solenoid LS' is deenergized and valve VLS returns to normal position blocking the connections between the manifold, the atmosphere, and cylinder L. When rod LR moves from neutral to low position it closes switch LMC2 which as described in the shift of low to intermediate closes circuit LISGIS at armature IA but as it also has to be closed at switch LNC2 circuit LIS GIS does not become energized at this time. As stated in the first paragraph under the heading Gear shift circuits details will now be given covering the position of rod LR in assembling the transmission and when this rod is in low gear position after automatic shifts have occurred. When the car is first started and disc GD brushes by and actuates switch L5 or after this disc has actuated shifts to intermediate or to high gear and has returned to contact and rest on dog 72 a position in which it actuates switch L5, this switch does not actuate circuit INS because rod IR is at neutral position with its offset IO holding switch INO2 open and therewith circuit INS. Simultaneously offset IO holds switch INC2 closed which closes circuit LS but as offset LO of rod LR is at low gear position holding switch LLO2 open and therewith circuit LINCS allowing circuit LS to be open at posts LNO and PX and as offset LO is holding switch LLO3 open and therewith circuit LS actuation of switch L5 does not actuate any gear shift circuit when the piston rod LR is in low gear position.

Direct high to low shift circuits

Should the transmission be functioning in intermediate gear and should disc GD have actuated any of the three switches H20, H30, H40 and should the car speed be decreased so rapidly that this disc moves to a position between switch I10 and switch L5 before circuit HSS energized by switches H20, H30, H40 has opened which it does upon completion of the shift of intermediate to high, the transmission will upon completion of this shift function in high gear until the car attains a speed that will cause disc GD to actuate switch I10 or until this disc comes to rest on dog 72 at which position it will actuate switch L5 and thereby actuate a shift directly from high to low gear through the means now to be described. Closure of switch L5 closes primary circuit LINP which closes the secondary circuit INS. Circuit INS actuates the shift of piston rod IR from its gear engaging position to its neutral position. At this time rod IR is at neutral position with its offset IO holding switch INO2 and therewith circuit INS open. This offset is also holding switch INC2 and circuit LS closed. Closure of circuit LS and its actuation would actuate rod LR from neutral to low gear position while high gear is functioning so to prevent this the switch HNC4 normally open at the neutral position of offset HO on rod HR is provided, which opens circuit LS when this rod is not at its neutral position. Means actuable by switch L5 for actuating rod HR from gear position to neutral position may comprise the following elements. A lead LHNP branches from lead GPP, continues to post LX, to connector LC, to post LV of switch L5, to a magnet LHN, to lead GNL, and to the negative pole of the battery. This actuates an armature HL to contact magnet LHN thereby closing a secondary circuit LHNS. This circuit branches from circuit GSC, continues to a switch HNO4, normally closed adjacent to the neutral position of offset HO on rod RH, to a solenoid HNS', to a post HH, to armature HL, to magnet LHN, to lead GNL, and to the negative pole of the battery.

Operation of the circuit LHNS

This circuit when energized actuates clutch CA and gas valve GVA as described under the heading "Electrical circuits" and also actuates solenoid HNS' and therewith the valve VHN which actuates the shift of rod HR from high gear position to its neutral position as previously described in the data covering the shift of high to intermediate gear. When rod HR reaches neutral position it opens switch HNO4 and therewith circuit LHNS thereby deenergizing solenoid HNS' allowing valve VHN to return to normal position blocking the connections between the manifold, the atmosphere, and cylinder H. In the shift of rod HR just above referred to its offset HO at neutral position closes switch HNC3 and therewith circuit HIS GIS. This circuit actuates the shift of rod IR from neutral to intermediate gear position. To prevent this during the shift of high to low the following means is provided. The circuit LINCS that energizes magnet LCS also energizes the magnet LOI. Connected to posts 3X and 4X adjacent to magnet LOI is the circuit HICS. When circuit LINCS functions which it does from the closure of switch L5 to the completion of the shift of rod LR from neutral to low gear position said circuit holds armature 2X in contact with magnet LOI, thereby holding circuit HICS open. Circuit HICS at magnet HK closes circuit HIS GIS and circuit HIS GIS actuates the shift of rod IR from neutral to its gear position. As circuit HICS can not function at this time circuit HIS GIS is open at posts X and W of magnet HK preventing the latter circuit actuating the shift of offset HO on rod IR from neutral position. When rod HR reaches its neutral position as mentioned earlier in this paragraph in addition to opening switch HNO4 it closes switch HNC4 therewith closing circuit LS which actuates clutch CA and gas valve GVA as detailed under the heading "Electrical circuit" and also actuates the shift of rod LR from its neutral to its gear position in the same manner as detailed in the description of the intermediate to low shift. When switch L5 is actuated when rod HR is at neutral position it does not energize circuit LHNS because this circuit is held open at switch HNO4.

Optical indicator circuits

The third group of electrical circuits will now be described.

In Figure 3 disclosing the two general groups of electric circuits is shown a lead ILC branching from lead GCC. In Figures 8, 9, 10, 11 and 12 this lead ILC is shown connected to a lead GILC having connections to an optical indicator containing light bulbs. Branching from lead GILC is a lead to each of five bulbs. Any suitable cover plate bearing proper insignia for indicating the neutral and gear positions of the transmission may be placed over the bulbs. The bulbs are indicated by characters N, R, L, I, H. A lead (see Figure 8) NIC branching from lead GILC extends to the neutral bulb N and continues to a switch NI normally open disposed in a position to be closed by rail RL, when this rail is at its neutral position, from this switch lead NIC continues to a switch N2 normally open so positioned as to be closed by offset IO of piston rod IR when this rod is at its neutral position, from switch N2 it continues to a switch N3 normally open so disposed as to be closed by offset HO of piston rod HR when this rod is at neutral position, then to a negative lead ILC', to lead GNL, and to the negative pole of the battery. When rail RL is at its neutral position and the rods above mentioned are at their neutral positions light bulb N will be illuminated, and it will not be illuminated when this rail and these rods are not at neutral positions, because circuit NIC will be open. Another lead (see Figure 9) RIC branching from lead GILC extends to bulb R and continues to a switch RS normally open disposed in a position to be closed by rail RL when this rail is at reverse position, from this switch lead RIC continues to negative lead ILC', to lead GNL, and to the negative pole of the battery. When rail RL is at reverse gear position it will close switch RS and bulb R will be illuminated, and when this rail is not at reverse position bulb R will not be illuminated. Another lead (see Figure 10) LBC connects lead GILC with bulb L and with a switch LBS normally open disposed in a position to be closed by rail RL when this rail is at low gear position. From this switch lead LBC continues to the negative ILC' lead, to lead GNL, and to the negative pole of the battery. When rail RL is at low gear position bulb L will be illuminated as switch LBS will be closed, and when this rail is not at low gear position this bulb will not be illuminated. Another lead (see Figure 11) IBC from lead GILC connects bulb I with a switch IBS normally open so positioned as to be closed by the offset IO on rod IR when this rod is at intermediate gear position, from this switch lead IBC continues to negative lead ILC', to lead GNL, and to the negative pole of the battery. When rod IR is at intermediate gear position bulb I will be illuminated as switch IBS will be closed, and when this rod is not at gear position bulb I will not be illuminated. A lead (see Figure 12) HBC connects lead GILC with bulb H and with a switch HBS normally open so disposed as to be closed by offset HO on rod HR when this rod is at high gear position, from this switch lead HBC continues to the negative lead ILC', to lead GNL, and to the negative pole of the battery. Bulb H will be illuminated when rod HR is at gear position holding switch HBS closed, and not illuminated when this rod is not at gear position.

Safety switch

In the event that some of the automatic means for shifting gears should fail to function properly at a time when switch LLOC has automatically closed the electric circuits, a safety switch (not shown) could be placed in the lead PCSC between the battery and and switch KS for cutting out the electric mechanism. This safety switch could be similar to switch KS and should be placed in some out of the way location so the driver could not thoughtlessly turn it off.

From the foregoing it will be seen that while a preferred embodiment of this invention has been disclosed, it is not desired to restrict the details to the exact construction shown, it being obvious that changes not involving invention may be made without conflicting with the spirit of the invention and the scope of the claims.

What I claim is:

1. In a speed changing mechanism, a plurality of rotatable shafts, speed changing means adapted to change the speed ratio of said rotatable shafts, speed controlled means connected to and adapted to be actuated by one of said rotatable shafts, electric means controlled by said speed controlled means, fluid means controlled by said electric means, said fluid means adapted to actuate said speed changing means, said electric means combining in combination a plurality of switches adapted to be actuated by said speed controlled means, a plurality of circuits adapted to be actuated by said plurality of switches, a plurality of magnets adapted to be actuated by said plurality of circuits, and a plurality of circuits adapted to be actuated by said plurality of magnets, said plurality of magnets serving to maintain closed circuits altho said speed controlled means cease to hold said switches closed.

2. In a speed changing mechanism, driving means, driven means, a plurality of speed changing means adapted to change the speed ratio of said driving means and said driven means, a plurality of fluid means, each of said plurality of fluid means adapted to actuate a plurality of said plurality of speed changing means, each of said plurality of fluid means including in combination controlling valvular means, a plurality of actuating means, each of said plurality of actuating means adapted to actuate one of said controlling valvular means, a plurality of movable means, each of said movable means adapted to actuate one of said plurality of actuating means, and centrifugal means adapted to actuate one at a time each of said movable means.

3. In a gear mechanism, a plurality of rotatable shafts, speed changing means including in combination speed controlled means, a plurality of electric circuits controlled by said speed controlled means, a plurality of fluid means adapted to be actuated by said electric means, and means adapted to be actuated by said fluid means for changing the speed ratio of said shafts, and gradient control means for opening one of said electric circuits at a plurality of points to prevent said speed controlled means actuating the circuit opened by said gradient control means.

4. In a speed changing mechanism, a plurality of rotatable shafts, and automatic means adapted to change the speed ratio of said shafts, said automatic means including in combination speed controlled means, electric means adapted to be controlled by said speed controlled means, fluid means adapted to be controlled by said electric means, a plurality of lever means adapted to be actuated by said fluid means, a plurality of reciprocating means adapted to be actuated by said plurality of lever means, said plurality of lever means adapted to move into and out of engagement with said plurality of reciprocating means, and speed changing means adapted to change the speed ratio of said rotatable shafts, said speed changing means adapted to be actuated by said plurality of reciprocating means.

5. In a speed changing mechanism, a plurality of rotatable shafts, a plurality of speed changing means, said plurality of speed changing means adapted to change the speed ratio of said rotatable shafts, actuating means for said plurality of speed changing means, said actuating means including in combination electric power supply means, master control magnetic means, a plurality of electric circuits connected to said power supply means, said plurality of electric circuits including in combination a plurality of secondary circuits, a plurality of magnetic means for controlling said plurality of secondary circuits, said plurality of secondary circuits adapted to control said master control magnetic means, a plurality of primary circuits for controlling said plurality of magnetic means, and speed controlled means for controlling said primary circuits, said master control magnetic means adapted to prevent a plurality of said primary circuits functioning simultaneously, said gradient control means when in one position adapted to open said last mentioned electric circuit at one of said plurality of points and when in another position adapted to open said circuit at another of said plurality of points.

CLIVE W. LANPHERE.

CERTIFICATE OF CORRECTION.

Patent No. 2,251,213.                                July 29, 1941.

CLIVE W. LANPHERE.

It is hereby certified that error appears in the printed specification of the above numbered patent requiring correction as follows: Page 1, first column, line 34, for the word "drawing" read --drawings--; page 3, second column, line 68, for "As" read --In--; page 8, second column, line 25, for "KSC" read --GSC--; page 9, second column, line 54, strike out "offset HO on" and insert the same after "When" in line 55; page 10, second column, line 52, claim 3, for "actuated" read --controlled--; page 11, second column, lines 7 to 12 inclusive, claim 5, strike out the comma and words ", said gradient control means when in one position adapted to open said last mentioned electric circuit at one of said plurality of points and when in another position adapted to open said circuit at another of said plurality of points" and insert the same after "means" and before the period on page 10, second column, line 58, claim 3; and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.